April 23, 1929.  G. E. LUCE  1,710,096
BRICK LIFTER
Filed Dec. 27, 1927   2 Sheets-Sheet 2
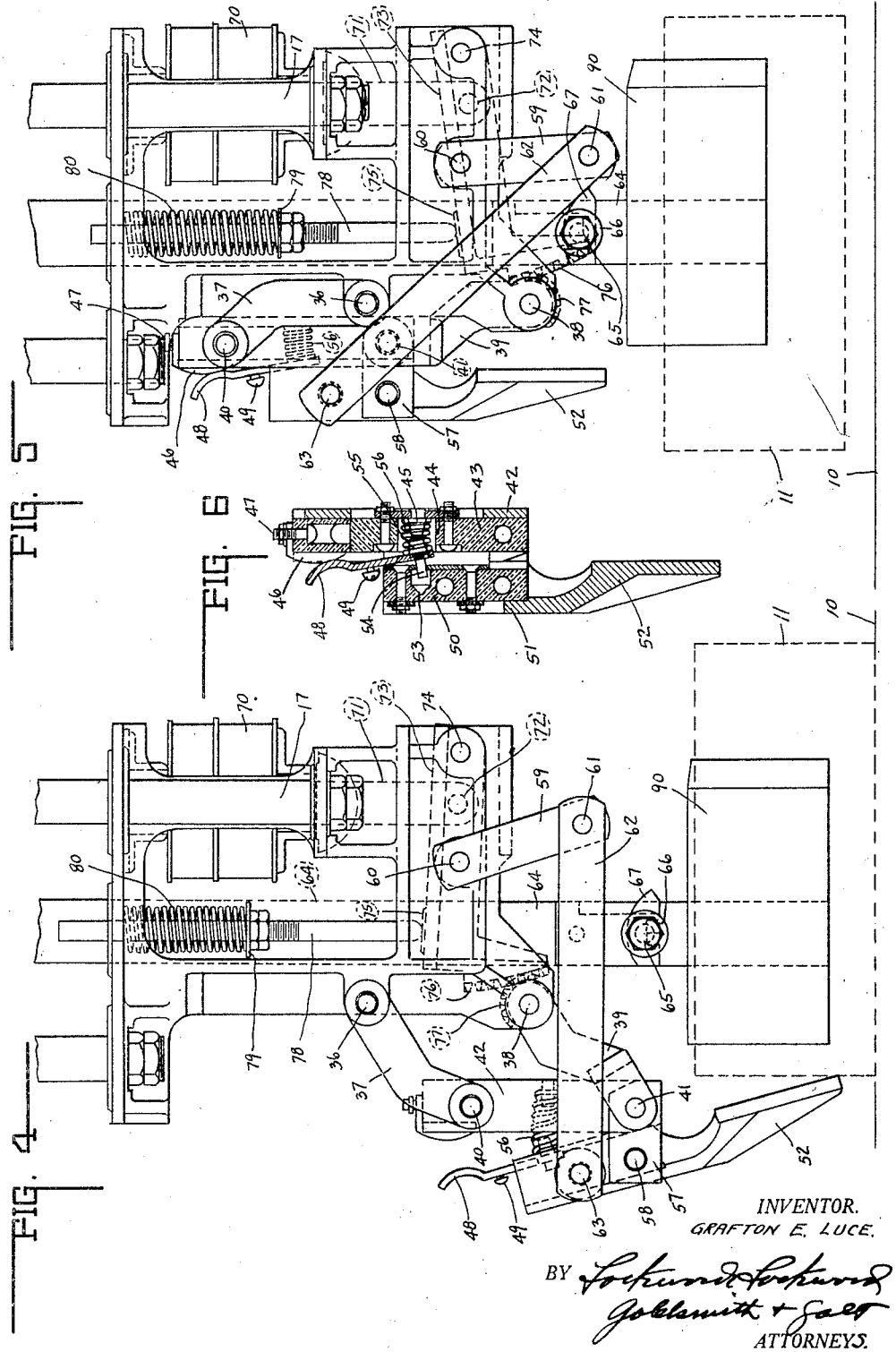
INVENTOR.
GRAFTON E. LUCE.
BY
ATTORNEYS.

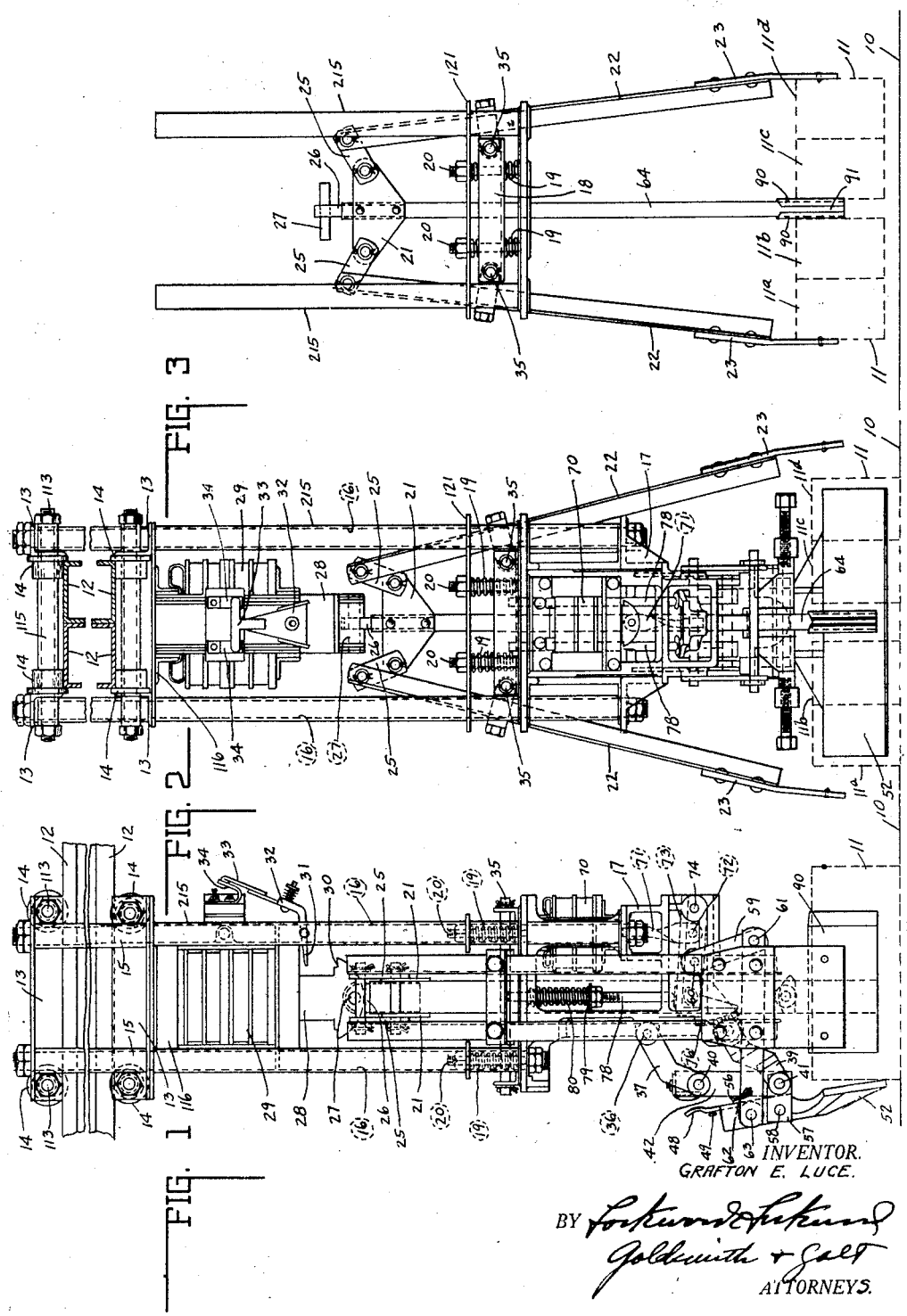

Patented Apr. 23, 1929.

1,710,096

UNITED STATES PATENT OFFICE.

GRAFTON E. LUCE, OF CHICAGO, ILLINOIS.

BRICK LIFTER.

Application filed December 27, 1927. Serial No. 242,665.

This invention relates to a machine for handling articles presenting opposed surfaces upon which oppositely directed forces may be applied for grasping the article and thereafter manipulating the grasped article as desired. This application is an improvement upon and continuation in part of the prior copending, similarly entitled, application Serial No. 47,515, filed August 1, 1925.

One of the chief objects of the invention is to avoid deforming the article when it engages the contactor for initiating the lifting, or while it is being lifted or when it is lifted and is subjected to subsequent handling.

Another object of the invention is to successively segregate and clamp a plurality of brick presented to it in predetermined relation.

The several features of the invention include the mechanism whereby the foregoing objects are accomplished and an additional feature of the invention resides in the improvement of the contactor switch construction.

The full nature of the invention will be understood from the accompanying drawings and the following description and claims:

Fig. 1 is a side elevational view of a machine with parts broken away and illustrating the lifter in a non-lifting position, the dotted lines indicating an article support and an article in the act of engaging the contactor. Fig. 2 is a front elevation of the same mechanism showing the same associated with a plurality of articles in transverse row and in separated arrangement. Fig. 3 is a view similar to Fig. 2 of a part of the mechanism showing the articles in segregated and elevated position and removed from the support. Fig. 4 is an enlarged side elevational view of the parts shown in Fig. 1, the dotted lines indicating the article and the article support. Fig. 5 is a view similar to Fig. 4 but with the article elevated and removed from the support and the contactor elevated and in closed circuit position. Fig. 6 is a vertical sectional view through the contactor and switch mechanism operable thereby.

In the drawings 10 indicates a support for a plurality of articles 11. The support may be an off-bearing belt for carrying brick such as green brick or the like and the same will be positioned beneath a brick lifting unit. 12 indicates a suitable brick lifting unit support in the form of a trackway comprised of four channels or similar members and a carriage construction movable thereon, said carriage being formed by the spaced pairs of angle irons 13 and the spacing sleeves or tubes 15 which support upon shafts 113 flanged rollers 14 which roll on the channel trackways, said rollers being maintained in spaced relation by the sleeves 115. The aforesaid constitutes a movable arrangement for the lifter unit supported by a plate 116 which receives the elongated rods 16 which extend thru the vertical spacing sleeves 15 of the carriage construction and the depending spacing sleeves 215 that are interposed between the carriage construction and a cradle 17.

A movable frame or saddle member, indicated by the numeral 18, has longitudinal movement relative to the cradle and moves toward and away from the same. It is normally maintained in position adjacent said cradle by springs 19 concentric with bolts 20 which, thru a plate 121, maintain adjusted tension on said springs and also serve as a yielding stop for the upper limit of travel, the lower limit being that of the top of the cradle 17. The springs 19 normally tend to return the saddle adjacent the cradle which, as hereinafter set forth, will maintain the clamping plates in the non-clamped or open position, if the parts do not return thereto by gravity when released from constraining force.

The clamping construction comprises a pair of clamping plates 23, each being carried by a pair of angle iron members 22 which are pivotally supported at their upper ends by a pair of links 25, said links being pivotally supported in turn upon a draw bar plate 21 carried by a draw bar member 26 pivotally connected at 27 by a pin to a core member 28 of a socket construction 29. The connection between 26 and 28 is a slot and tongue arrangement, as shown in Figs. 1 and 2. The end of the core includes a cam face or abutment 30 for engaging the projecting end 31 of a switch construction 32 having contacts 33 and 34, the former being carried by member 32 and the latter by the frame. The switch 33—34 controls the solenoid operation 29, as hereinafter set forth.

Each of the pairs of angle irons 22 are pivotally connected at 35 to the saddle 18. Thus an upward pull on the draw bar of core 28 causes the links 25 to move outwardly and upwardly, thereby causing the clamping plates 23 to approach each other since the lever angle irons 22 are fulcrumed at 35—but upon a movable fulcrum since the saddle member 18 moves upwardly as the entire construction is elevated after the articles have been clamped. The initial application of force thru the leverage above set forth first slides the articles into closer relation and thereafter clamps them, the remainder of the application of force, exerted by the solenoid thru the movement of the core, results in the lifting movement of the article, and simultaneously therewith the switch 33—34 is opened.

Reference will now be had more particularly to Figs. 4 and 5, although the same construction is shown in side elevation and front elevation on a smaller scale in Figs. 1 and 2. Pivotally mounted upon the cradle 17 at 36 is a link 37 and immediately therebeneath there is also pivotally mounted at 38 a link 39. The links 37 and 39 are pivotally mounted at 40 and 41, respectively, to a switch support 42 which comprises a plate carrying an insulation block 43 having a central aperture 44, the plate including a spring seat and guide member 45 positioned within the recess or aperture 44. Mounted upon the insulation block 43 is a pair of parallel and curved contact or segment bars 46 suitably secured thereto and carrying the terminals 47 to which current carrying wires are connected, one being the supply wire to the switch and the other being the supply wire from the switch to the solenoid 29. A contact member having the head portion 48 and the body portion 49 is loosely mounted upon an insulation block 50 carried by a metal body portion 51 that has a contactor or trigger extension 52 depending therefrom. The mounting of the T-shaped contactor includes a recess 53 in the block 50 to receive a guiding stem or tail 54, and oppositely therefrom there extends a spring retainer and guide 55. Interposed between the T-shaped contactor and the plate 42, there is a coil spring 56 which normally maintains the T-shaped contactor in mounted relation upon the finger construction, and when the finger is in the switch closing position spring 56 normally exerts pressure to cause the head portion 48 to bridge the two parallel curved contacts 46 and complete the circuit to the solenoid 29. The contactor body portion is pivotally supported between a pair of plates or bars 57 and 58 and said plates 57 are carried by the switch supporting base 42.

A link 59 is pivotally supported at 60 upon the cradle and pivotally supports at its opposite end at 61 a link 62 which pivotally supports at its opposite end at 63 the movable contactor construction. When the support or offbearing belt 10 presents an article in the form of a brick or the like 11, to the contactor or finger 52, the latter is engageable by means hereinafter to be set forth and further travel of the article tilts the trigger and movable contactor portion clockwise to bridge the curved segments 46 by the T-shaped member 48 which energizes solenoid 29, which, through the lever and linkage construction previously described, causes plates 23 to engage the sides of and clamp the articles or article. The aforesaid lever and linkage mechanism is duplicated and connected together.

Depending from draw-bar, plate or head 21 is a bar member 64 and said bar member carries upon a transversely positioned pin or the like 65 a roller 66 and adjacent thereto a cam 67. When the solenoid 29 is energized the bar 64 moves upwardly with the article and the clamping plate and engages the transverse link 62 and tilts the same on the roller 66 as a movable fulcrum until the parts move from the position shown in Fig. 4 to the position shown in Fig. 5. It will be understood that since links 37 and 39 are of substantially the same length and their pivotal connections are substantially in parallelogram arrangement at all times that a parallelogram movement occurs such that the trigger 52 moves upwardly and forwardly away from the article 11 until it gets above the same, whereupon it again moves inwardly and lies above the article as shown in Fig. 5.

This operation accomplishes two purposes. In the first place the trigger in moving upwardly clears the corner of the article and there is no tendency to scrape the same or otherwise deform it. Thus, end cut brick can be readily handled, as well as other types of brick. Furthermore, the construction is relatively compact and when a plurality of brick lifters are employed in a single construction (see the prior Patents No. 1,601,868, entitled Segregator, issued October 5, 1926, and No. 1,627,656, entitled Hacking machine, issued May 10, 1927), these lifting units may be positioned in substantially "cleared" relation even though the articles be positioned in abutting relation. In other words, the trigger arrangement when in nested position, as shown in Fig. 5, does not extend beyond the projected outline of the saddle 17. It may be here noted that when the link or bar 62 is tilted clockwise in the elevating movement, the tendency of the spring 56 is to tilt the T-shaped contactor into switch closing position and maintain the same therein with predetermined pressure as set forth, and it will be noted that the foregoing scissor or toggle construction is also slightly over center and is maintained in that position by the cam portion 67 as long as solenoid 29 is energized.

Immediately upon deenergization of the solenoid 29 through a suitable control the spring 19 becomes effective if the weight of the parts is not sufficient to return the same (except the contactor) to the position shown in Fig. 2. When the draw-bar head 21 moves downwardly the links 25 move inwardly and the clamping plates 23 move outwardly as well as downwardly therewith. Also the bar 64 moves downwardly and the sustaining force for the trigger and supporting linkage is removed. However, the latter does not return to the lower position (shown in Fig. 4) upon deenergization of the solenoid 29. The reason for this is that if a hacking machine includes a lifter of the character described herein the hacking machine after unloading over the brick may require subsequent manipulation for repositioning to receive brick and in that event it may be, and is desirable, that the several contactors be not returned to the contacting position. It is essential that none of the contactors be returned except the initial contactor so that the subsequent contactors will not interfere with the oncoming brick. This arrangement and operation is disclosed in the copending, similarly entitled application, Serial No. 47,515, filed August 1, 1925, before mentioned.

In order to positively position in the brick engageable position each contactor when a series thereof is employed, the solenoid 70 is provided. The core 71 thereof is in the form of a twisted bar pivotally connected at 72 to a lever 73 pivoted at 74. Lever 73 at its free end includes an abutment 75 and a segmental rack or gear 76 which meshes with a segmental gear 77 carried by or integral with the link 39. Solenoid 70 is included in the circuit controlled by the switch 33—34. A rod 78 is slidably supported by the cradle and is threaded for adjustment of the plate 79 for adjusting the tension of the concentrically mounted coil spring 80.

When the solenoid 29 is energized through some remote control or from a preceding unit as before set forth or by an independent switch, the circuit is completed through the switch 33—34 and solenoid 70. This lowers core 71 which rocks the lever 73 upon its pivot and raises the segmental gear or rack 76 from the position shown in Fig. 5 to the position shown in Fig. 4, and in this clockwise tilting movement of the lever the segmental gear 77 causes the linkage supporting the trigger and switch construction of the contactor arrangement to move in a reverse direction and be projected downwardly over center after which gravity assists in the lowering movement until suitable stop means limits further lower travel. The finger is then in the position shown in Fig. 4. In the movement from the position shown in Fig. 5 to Fig. 4, the lever travel is cushioned by the spring 80, which also limits the lowering movement or position of the trigger 52. It will also be observed that spring 80 (see Fig. 5) is effective to normally maintain the contact 48 in bridging engagement with segments 46 when the solenoid 29 is energized which prevents accidental opening of the switch.

In the elevational movement of the article after the switch 48—46 has been closed and solenoid 29 is energized the bar links 62 are engaged by the rollers 66 and are elevated in this elevational movement. The segmental gear 77 which meshes with the segmental gear or rack 76 causes the lever to return from the position shown in Fig. 4 to the position shown in Fig. 5 and this is assisted also by the spring 80. During a portion of the period the solenoid 70 has been energized. When the core 28 reaches a predetermined position which is substantially the elevated position, the cam or abutment 30 thereof engages the projected portion 31 of the switch 33—34, opens it and maintains it open. This deenergizes solenoid 70 and permits the lever 73 and core 71 to remain in the lowered position to which it has been positively moved in opposition to the solenoid 70 by the solenoid 29 in the elevational movement of the article.

Figures 2 and 3 illustrate in detail the segregation of the brick or articles prior to grasping. In Figs. 2 and 3 the brick are indicated by the designations 11$^a$, 11$^b$, 11$^c$, and 11$^d$, and as shown in Fig. 2 the brick are supplied in transverse row arrangement, bricks 11$^a$ and 11$^b$ being in abuttable relation or separated as desired, and 11$^c$ and 11$^d$ similarly positioned but the two groups of brick are separated. When the four streams of brick are supplied in individually separated relation and it is desired to segregate the pairs of brick, or when the brick are supplied in four streams, two of which are paired with the pairs in separated relation, then a segregating plate or spacer 90 is provided which has a tapered edge 91 and said spacer being carried by the bar 64. When the two plates 23 are drawn together, if the brick 11$^a$ and 11$^b$ are separated and 11$^c$ and 11$^d$ are separated, the first movement towards each other is to abut two pairs of brick and then the abutting pairs of brick engage the spacing plate 90. Continued application of the force of solenoid 29 serves to clamp the brick in segregated relation and therefore, when clamped, the remainder of the force is applied for lifting.

While the invention is herein shown applied to but four brick, it is to be understood that the same can readily handle two individual brick and clamp the same in segregated relation, or can handle a plurality of brick by adding additional bars 64 and additional segregating members 90. All that is required is to have the spread of the plates 23 sufficient to transversely straddle the entire column of brick and not tip the brick when the segregating movement occurs.

The invention claimed is:

1. In a lifting device the combination of a pair of oppositely acting clamping plates for clamping an article therebetween, pressure operable means, a linkage connection between said pressure operable means and said clamping plates for clamping and thereafter lifting an article when clamped, a trigger interposed in the path of the article and engageable thereby, a normally open control for said pressure operable means closable upon engagement of said trigger by the article, and means operable by said pressure operable means for elevating the trigger upwardly and outwardly from the path of the article when elevated.

2. In a lifting device the combination of a pair of oppositely acting clamping plates for clamping an article therebetween, pressure operable means, a linkage connection between said pressure operable means and said clamping plates for clamping and thereafter lifting an article when clamped, a trigger interposed in the path of the article and engageable thereby, a normally open control for said pressure operable means closable upon engagement of said trigger by the article, and means operable by pressure operable means for elevating the trigger with the elevation of the article and positioning the same immediately above the article and within the upwardly projected outline thereof.

3. In a lifting device the combination of a pair of oppositely acting clamping plates for clamping an article therebetween, pressure operable means, a linkage connection between said pressure operable means and said clamping plates for clamping and thereafter lifting an article when clamped, a trigger interposed in the path of the article and engageable thereby, a normally open control for said pressure operable means closable upon engagement of said trigger by the article, and means operable by said pressure operable means for elevating the trigger upwardly and outwardly from the path of the article when elevated and positioning said trigger immediately above the article so that no part projects beyond the upwardly projected outline of the article.

4. In an article handling device, the combination of a trigger positionable in the path of the article, a switch construction having a plurality of members, one of the members thereof being supported by said trigger and movable therewith, a parallelogram construction supporting said trigger and said switch construction, and means for elevating said switch construction.

5. A device as defined by claim 4, characterized by the addition of means normally maintaining said trigger in non-engageable position, and other means for lowering said trigger in article engageable position in opposition to said trigger maintaining means.

6. In an article handling device, the combination of a trigger positionable in the path of the article, a switch construction having a plurality of members, one of the members thereof being supported by said trigger and movable therewith, a parallelogram construction supporting said trigger and said switch construction, and means for elevating said switch construction, said means including a lever, a segmental gear and a mating gear.

7. A device as defined by claim 6 characterized by the addition of means normally maintaining said trigger in non-engageable position, and other means for lowering said trigger in article engageable position in opposition to said trigger maintaining means.

8. In a contactor construction the combination of a pair of spaced parallel bar members, a bridging bar movably supported adjacent thereto, a fulcrum arrangement associated with said bridging bar, a support for said parallel bar members supporting the same in insulated relation, and spring means interposed between said bar member support and the bridging bar for normally maintaining the bridging bar in open circuit position when the same is in one position and in closed circuit position when the same is in a second position.

9. In a lifting device, the combination of a pair of clamping plates applying a predetermined force for clamping an article between said plates and applying the remainder of the force for elevating the article and said plates when clamped, a segregating member interposed between said plates and adapted to be positioned between a plurality of articles for spacing the same when straddled by said plates and clamped thereby, and said segregating member being relatively stationary with respect to the transverse movement of the plates toward each other.

In witness whereof, I have hereunto affixed my signature.

GRAFTON E. LUCE.